April 24, 1928.  1,667,009
G. L. MATTHIAS
METHOD AND APPARATUS FOR MAKING LAMINATED STRIPS
Filed Feb. 16, 1924  2 Sheets-Sheet 1
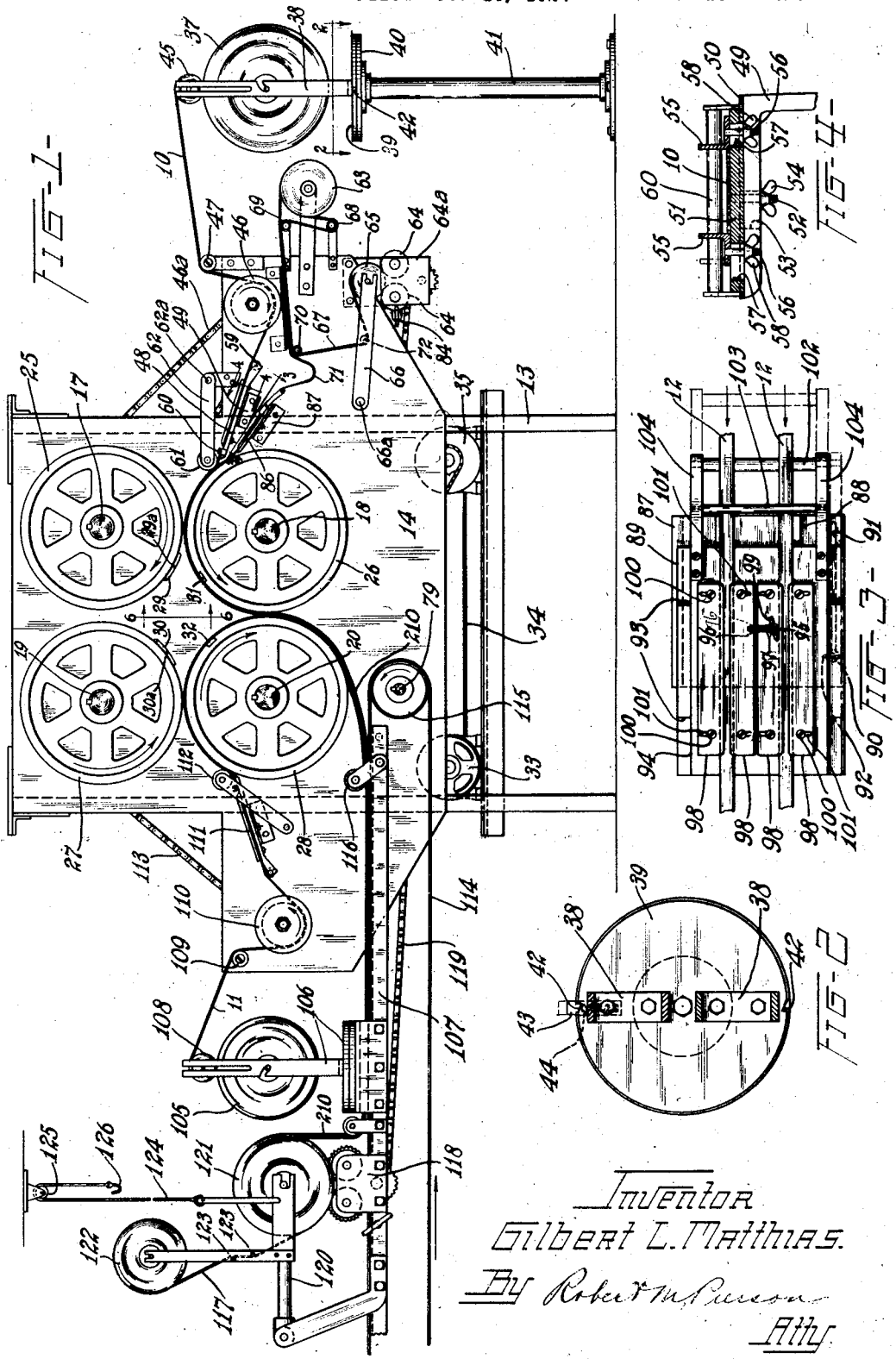
Inventor
Gilbert L. Matthias.
By Robert M. Pierson
Atty

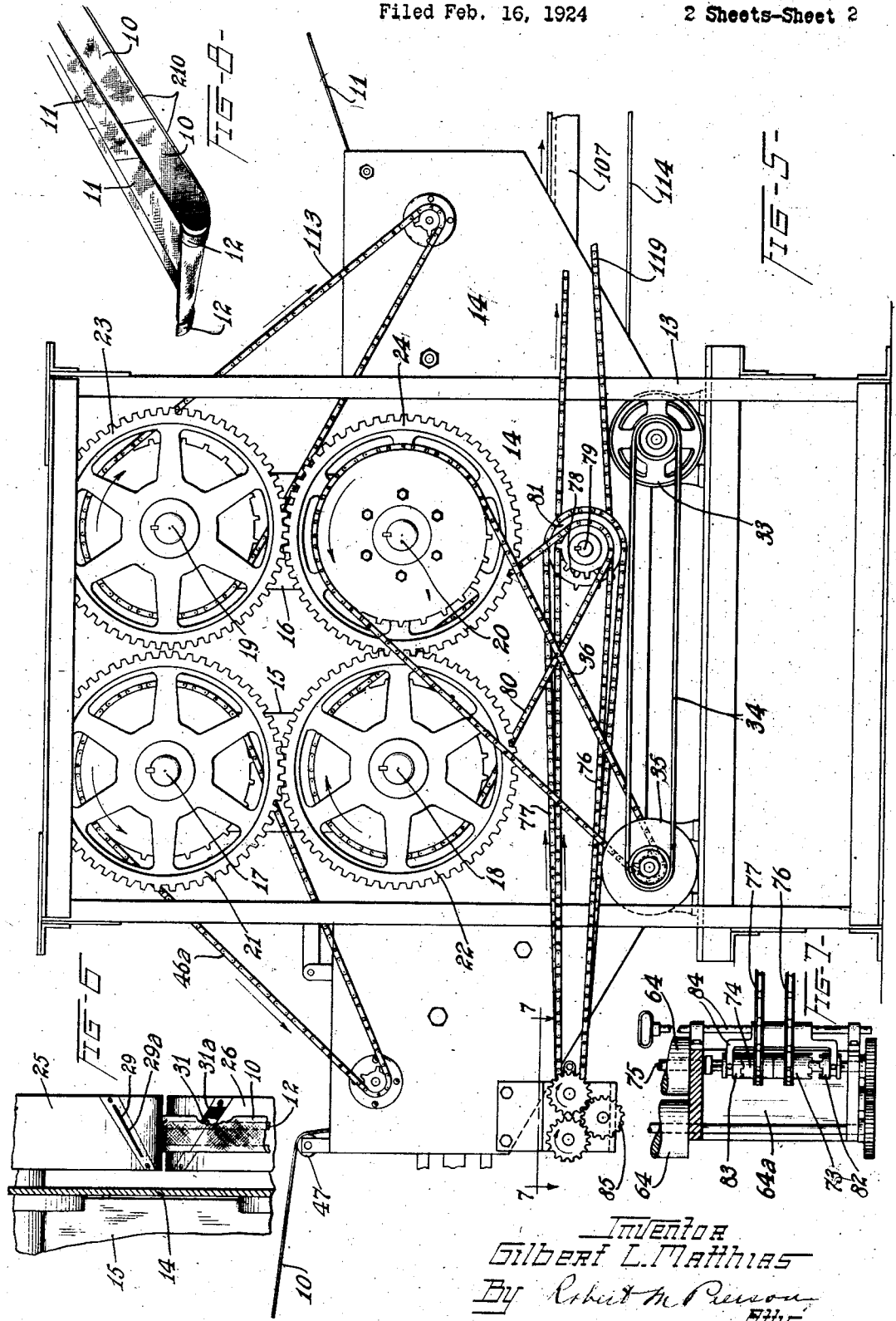

Patented Apr. 24, 1928.

1,667,009

UNITED STATES PATENT OFFICE.

GILBERT L. MATTHIAS, OF CUYAHOGA FALLS, OHIO, ASSIGNOR TO THE B. F. GOODRICH COMPANY, OF NEW YORK, N. Y., A CORPORATION OF NEW YORK.

METHOD AND APPARATUS FOR MAKING LAMINATED STRIPS.

Application filed February 16, 1924. Serial No. 693,398.

This invention relates to the art of making laminated strips, and more particularly laminated strips of adhesive, rubberized fabric, or of fabric and rubber, and is of especial advantage in forming strips wherein the ends of the plies are imbricated or longitudinally offset. My invention is particularly applicable to the manufacture of plied strips such as are used in the manufacture of pneumatic tires, as bead-covering strips, for example, the offset condition of the end portions of the plies making it possible to splice the same, either before or at the time of the incorporation of the strip in the tire, without splices of successive plies coming at the same point on the circumference of the tire.

The chief object of my invention is to provide an improved method and improved apparatus for the manufacture of laminated, imbricated strips, whereby labor may be reduced and time saved. A further object is to produce strips of uniform and accurate construction, and more particularly strips in which the ends of the plies are longitudinally offset as described. Another object is to conveniently provide for accurately varying the relation of the plies in the strip as between successive runs of the apparatus.

Of the accompanying drawings:

Fig. 1 is a front elevation of apparatus embodying and adapted to carry out my invention, in its preferred form, and the work therein.

Fig. 2 is a sectional plan view on line 2—2 of Fig. 1.

Fig. 3 is a view, represented by the line 3—3, and the accompanying arrows, of Fig. 1, of a work-guiding device constituting a part of said apparatus.

Fig. 4 is a sectional view on line 4—4 of Fig. 1.

Fig. 5 is a rear elevation on a larger scale of part of the apparatus shown in Fig. 1.

Fig. 6 is a fragmentary section on line 6—6 of Fig. 1.

Fig. 7 is a fragmentary, sectional plan view on line 7—7 of Fig. 5.

Fig. 8 is a perspective view of a part of the work in its finished form.

Referring to the drawings, the embodiment of my invention here shown is adapted for manufacture of a particular type of bead-covering strip or unit, the joined end portions of two such units being clearly shown in Fig. 8. Each of said strips or covering units comprises a relatively wide strip of bias-cut, rubberized fabric 10, a relatively narrow strip 11 of the same material and same length, adhesively superposed thereon, said strips having their respective ends obliquely cut and longitudinally offset from each other, and a plurality of thin, narrow strips of unvulcanized rubber 12, 12 longitudinally disposed upon and adhering to the reverse side of the wide fabric strip 10.

In the preferred manufacture of the laminated units, the component elements, which are brought to the machine in continuous lengths, are progressively fed, longitudinally, into face to face contact, and severed at proper intervals as they are so fed, to produce the finished units as described, the strips 12 preferably being first applied to the reverse side of the strip 10, before the latter is severed into units. In this method of manufacture, the offset portion of a ply at the trailing end of one laminated unit will underlie the offset portion of a ply constituting the leading end of the succeeding unit, as the successive units are formed, the adhesive units thus adhering together and constituting, in effect, a continuous laminated strip as they emerge from the machine. Such continuous strip of adhering units, designated 210, may be either continuously wound with a liner into a roll, or the units may be separated as they emerge from the machine and stored between liners in suitable books.

The apparatus here shown for carrying out my method comprises a frame 13 supporting a vertical plate 14 having secured to its rear face bearing brackets 15, 16 (Fig. 5) for two horizontally aligned pairs of superposed roll shafts 17, 18, 19, 20, extending through said plate and geared together at the rear of the latter by gears 21, 22, 23, 24, said shafts having secured thereon at the front side of the plate respective pairs of cutting rolls, 25, 26, 27, 28, of equal effective size, the lower roll of each pair being a platen roll, and the two lower or platen rolls being so positioned adjacent each other as to constitute a pair of presser rolls for strip material passing downward between them. The upper roll of each pair, 25 or 27, is provided with an obliquely disposed cutter,

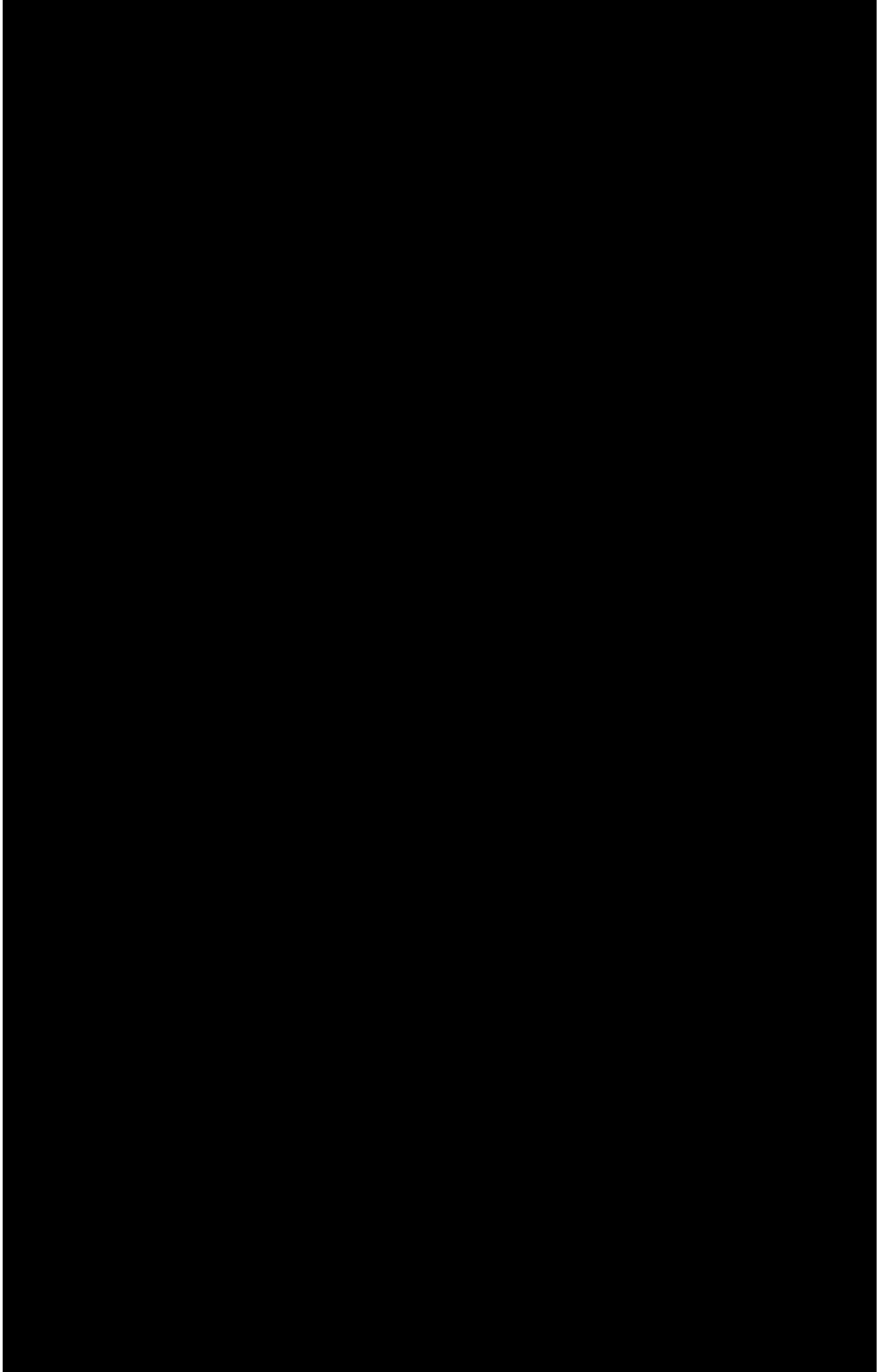

For supplying the rubber strips 12, a stock roll 63 is journaled upon a bracket projecting from the plate 14 and driven, liner-rewinding means are provided for withdrawing said strips from the stock roll and feeding them to the platen roll 26 so as to avoid excessive tensioning and stretching of said strips. Said liner-rewinding means comprises a pair of driven cradle rolls 64, 64 (Fig. 1) journaled on a double U-shaped bracket 64ª secured to the plate 14, said cradle rolls being adapted to support and peripherally drive a liner roll 65, the latter being loosely journaled in the forked free ends of a pair of arms, one of which is shown at 66, pivoted at 66ª on the plate 14, and adapted to keep the liner roll in position notwithstanding increase in the amount of liner thereon.

For assuring separation of the strips 12 and their liner, 67, as they pass from the stock roll 63, liner-guiding rolls 68, 69, are journaled upon brackets projecting from the plate 14 and are so positioned, as shown clearly in Fig. 1, that the liner, being carried first under the roller 68 and then over the roller 69, is drawn from the stock roll at a different tangent from that of the strips 12, the latter passing directly from the stock roll onto the liner at the roller 69 and from there being carried by the liner, without substantial adhesion thereto, over a guide roll 70 projecting from the plate 14, and delivered into a storage loop 71 while the liner, 67, passes about a guide roller 72 journaled between the arms 66, near their middle, and onto the liner-rewinding roll 65.

In order that the rubber strips 12 may normally be fed into the storage loop 71 at approximately the same speed as that of the fabric strip 10, but may be fed at a faster speed to replenish said loop in case it is shortened by shrinkage of the strips 12 as they emerge from the stock roll, means are provided for driving the cradle rolls 64 normally at the same peripheral speed as that of the strip 10 and on occasion at a faster speed. Said means, details of which are shown in Fig. 7, comprises a pair of sprockets, 73, 74, formed with clutch hubs, loosely journaled on the shaft 75 of one of the cradle rolls, and adapted to be driven at different speeds by respective sprocket chains 76, 77, the chain 76 running from a sprocket 78 (Fig. 5) on a counter-shaft 79 journaled in the plate 14 and having driving connection, through a sprocket chain 80 with the shaft 18, the sprocket 78 being of appropriate size to drive the cradle rolls at normal speed, while the chain 77 runs from a larger sprocket 81 on said counter-shaft, of appropriate size to speed up the feed of the rubber strips 12 on occasion, respective clutches 82, 83 being slidably keyed upon the shaft 75 and adapted to coact, selectively with the clutch hubs of the sprockets 73, 74, for effecting driving connection between one or the other of said sprockets and the cradle rolls, a shipper mechanism 84, common to said clutches, being slidably mounted upon the bracket 64ª for holding either of said clutches engaged while the other is disengaged. The cradle rolls 64 are geared together at the rear of the journal bracket, through an idler gear 85, so that both will be positively driven, in the same direction, by rotation of the shaft 75.

A guiding device 86 (Fig. 1) mounted upon the plate 14, is provided for directing the rubber strips 12 onto the platen roll 26 in proper spaced relation to receive the wide fabric strip 10, said device comprising, as shown in detail in Fig. 3, a supporting bracket 87 mounted upon the plate 14 and formed on its upper face with a guide-rib 88 disposed longitudinally of the work, and a slide 89 mounted on said guide-rib and adapted to be secured in different positions longitudinally thereof by a stud-bolt 90 projecting from said slide through a slot 91 in said bracket and provided with a wing-nut 92 below the latter, the guiding device thus being adapted to be positioned close to the platen roll 26 for operation and to be withdrawn therefrom for adjustment or for insertion of the work. The slide 89 is formed on its upper face with a guide-rib 93, disposed transversely of the work, upon which is mounted a slide 94 adapted to be secured in different positions laterally of the direction of movement of the work by a stud-bolt 95 projecting from the upper face of the longitudinally adjustable slide 89, through aligned slots 96, 97 formed respectively in the laterally adjustable slide 94 and in one of a set of overhanging side guides 98, 98 mounted on said slide 94, said stud-bolt being provided with a wing-nut 99. The overhanging side guides 98, of which a pair is provided for each of the rubber strips 12, are adjustably secured to the laterally adjustable slide by screws 100, 100 mounted in transverse slots 101, 101 in said guides and threaded into said slide, so that said guides may be individually positioned for strips of different widths or for varying the spacing of the strips, while the position of the strips 12 may be varied with relation to the wide fabric strip 10, without varying their spacing, by adjustment of the slide 94. Anti-friction rollers 102, 103, adapted to contact the lower and the upper faces respectively of the rubber strips 12, are journaled between brackets 104, 104 projecting from the receiving end of the slide 94.

For supplying the narrow fabric strip 11 in continuous form to the platen roll 28, a stock roll 105 (Fig. 1) is journaled on a turret structure 106 corresponding to that demovement of the work past said severing positions as to cause the cuts of the strips to mis-match as the cut strips are brought together, compacting and further feeding the united strips by rolling pressure whereby the imbricated end portions of successive units are pressed against each other in overlapped relation, and thereafter separating said units.

6. Apparatus for making laminated units of adhesive sheet material, said apparatus comprising a pair of rolls for feeding a plurality of continuous strips of said material progressively into contact with each other and uniting them by rolling pressure, and cutters geared so out of step with each other as to be adapted for substantially severing said strips at such determinate intervals, as they are so fed, as to cause them to unite in a continuous strip composed of laminated, longitudinally imbricated units overlapped and adhering to each other at their ends.

7. Apparatus for making laminated units of adhesive sheet material, said apparatus comprising a pair of rolls for feeding a plurality of continuous strips of said material progressively into contact with each other and uniting them by rolling pressure, cutters geared so out of step with each other as to be adapted for substantially severing said strips at such determinate intervals, as they are so fed, as to cause them to unite in a continuous strip composed of laminated, longitudinally imbricated units overlapped and adhering to each other at their ends, and means for reeling the continuous composite strip as it is formed.

8. Apparatus for making laminated units of adhesive sheet material, said apparatus comprising a pair of coacting presser rolls adapted to serve also as platen rolls, and a rotary cutter for each said roll adapted to cut thereagainst, the said cutters being geared so out of step with each other as to act, upon respective strips passing about the presser rolls to the nip of the latter, at such longitudinal positions on the strips as to cause the cut terminus of one of the strips to reach the said nip before that of the other strip.

9. Apparatus for making laminated, longitudinally imbricated units of adhesive sheet material, said apparatus comprising a pair of presser rolls, means for guiding respective strips of said material onto the peripheries of said rolls, respective means for substantially severing said strips at determinate intervals as said strips pass on said rolls to the nip of the latter, and respective rollers adapted to press said strips against each of said rolls between the position of initial contact of the strip therewith and the cutting position.

10. In apparatus for making laminated strips, the combination of a pair of rotary cutters adapted to cut respective strips of material at determinate intervals and press the cut strips together, respective means for feeding said strips to said cutters at determinate speeds, and means for varying the speed of one of said feeding means.

11. In apparatus for making laminated strips, the combination of a pair of rotary cutters adapted to cut a plurality of strips of material and progressively press them together, means for supplying said strips to said cutters, and adjustable guides anterior to said cutters for positioning the strips with relation to each other as they pass to said cutters.

12. In apparatus for making laminated strips, the combination of a pair of juxtaposed rotary cutters adapted substantially to sever and to press together a plurality of strips of material, the cutting members of said rotary cutters being so disposed and geared out of step with each other as to cause the lines of cut of the respective strips to be longitudinally offset, and obliquely disposed, in parallel relation to each other.

In witness whereof I have hereunto set my hand this 5th day of February, 1924.

GILBERT L. MATTHIAS.